(12) United States Patent
Lee

(10) Patent No.: US 9,638,404 B2
(45) Date of Patent: May 2, 2017

(54) PORTABLE FLASHLIGHT WITH WIRELESS SWITCHING FUNCTION

(71) Applicant: Sang Deuk Lee, Gwangju (KR)

(72) Inventor: Sang Deuk Lee, Gwangju (KR)

( * ) Notice: Subject to any disclaimer, the term of this patent is extended or adjusted under 35 U.S.C. 154(b) by 0 days.

(21) Appl. No.: 14/776,064

(22) PCT Filed: May 1, 2013

(86) PCT No.: PCT/KR2013/003772
§ 371 (c)(1),
(2) Date: Sep. 14, 2015

(87) PCT Pub. No.: WO2014/142383
PCT Pub. Date: Sep. 18, 2014

(65) Prior Publication Data
US 2016/0025317 A1  Jan. 28, 2016

(30) Foreign Application Priority Data

Mar. 15, 2013 (KR) ........................ 10-2013-0027651

(51) Int. Cl.
*F21V 23/04* (2006.01)
*F21V 21/096* (2006.01)
(Continued)

(52) U.S. Cl.
CPC ......... *F21V 23/0435* (2013.01); *F21S 48/211* (2013.01); *F21V 21/0965* (2013.01);
(Continued)

(58) Field of Classification Search
CPC .................................................... F21V 23/045
(Continued)

(56) References Cited

U.S. PATENT DOCUMENTS 4,878,501 A * 11/1989 Shue .................. A61B 7/04
600/493
2006/0171145 A1 8/2006 Ford et al.
(Continued)

FOREIGN PATENT DOCUMENTS

JP         62-33102 U      2/1987
KR      2000-0019679 A    4/2000
(Continued)

OTHER PUBLICATIONS

International Search Report for PCT/KR2013/003772 dated Nov. 27, 2013.

*Primary Examiner* — Andrew Coughlin
*Assistant Examiner* — Keith Delahoussaye
(74) *Attorney, Agent, or Firm* — STIP Law Group, LLC

(57) ABSTRACT

The present invention relates to a portable flashlight, and more particularly to a portable flashlight which has a wireless switching function for turning on or off the flashlight by means of a radio signal in addition to a manual switch provided on the outside of the flashlight. The flashlight can not only be turned on or off by means of an external radio signal, but also be used in various ways such as turning on a part of the lamp or intermittently turning on the flashlight. A flashlight according to the present invention includes a power supply part, a lamp for generating a light by means of the power from the power supply part, and a manual switch connected between the lamp and the power supply part for switching the flashlight, characterized by further including a radio switch in addition to or instead of the manual switch, wherein the radio switch consists of a radio receiver for receiving an external radio signal to operate the radio switch.

1 Claim, 7 Drawing Sheets

(51) Int. Cl.
- *F21S 8/10* (2006.01)
- *F21V 21/40* (2006.01)
- *F21L 4/02* (2006.01)
- *F21L 4/04* (2006.01)
- *F21Y 101/00* (2016.01)
- *F21Y 105/10* (2016.01)
- *F21Y 115/10* (2016.01)
- *B60Q 1/26* (2006.01)
- *B60Q 1/52* (2006.01)

(52) U.S. Cl.
CPC .......... *F21V 21/406* (2013.01); *F21V 23/045* (2013.01); *F21V 23/0414* (2013.01); *B60Q 1/2611* (2013.01); *B60Q 1/2615* (2013.01); *B60Q 1/52* (2013.01); *F21L 4/027* (2013.01); *F21L 4/04* (2013.01); *F21Y 2101/00* (2013.01); *F21Y 2105/10* (2016.08); *F21Y 2115/10* (2016.08)

(58) Field of Classification Search
USPC ........................................................ 362/486
See application file for complete search history.

(56) References Cited

U.S. PATENT DOCUMENTS

| | | | |
|---|---|---|---|
| 2008/0055891 A1* | 3/2008 | Mattheis | F21V 23/0414 362/157 |
| 2009/0154148 A1 | 6/2009 | Meyer et al. | |
| 2011/0122609 A1 | 5/2011 | Dahlin | |
| 2012/0019370 A1 | 1/2012 | Mironichev et al. | |
| 2012/0020063 A1* | 1/2012 | Mironichev | F21L 4/025 362/191 |

FOREIGN PATENT DOCUMENTS

| | | |
|---|---|---|
| KR | 10-1127812 B1 | 3/2012 |
| KR | 10-1197870 B1 | 11/2012 |
| KR | 10-2012-0133047 A | 12/2012 |

* cited by examiner

PORTABLE FLASHLIGHT WITH WIRELESS SWITCHING FUNCTION

CROSS-REFERENCE TO RELATED APPLICATIONS

This application is the U.S. National Phase under 35 U.S.C. §371 of International Application No. PCT/KR2013/003772, filed on May 1, 2013, which in turn claims the benefit of Korean Application No. 10-2013-0027651, filed on Mar. 13, 2013, the disclosures of which are incorporated by reference into the present application.

TECHNICAL FIELD

The present invention relates to a portable flashlight, and in particular to a portable flashlight with a wireless switching function which allows to distantly turn on or off the lamp of a flashlight using a radio signal in addition to a switch disposed on an outer surface of the flashlight.

The present portable flashlight is directed to a portable flash light which is able to receive an external radio signal and decrypt the received external radio signal, thus turning on or off the lamp of a flashlight based on the decrypted signal. The lamp may be operated in various ways, for example, a part of the lamps can be configured to turn on or flicker.

BACKGROUND ART

A flashlight is a small size hand-held portable flashlight using a battery as a main electric power and in general is configured in a structure wherein there is provided a predetermined flickering means so as to turn on a light on at least one lamp based on the supply of electric power. Such a flashlight can be carried and used for an outdoor life or a night activity so as to light a road ahead or a dark area.

The lamp of such a flashlight in general consists of a plurality of lamps which can be turned on to beam when electric power is supplied. It can be configured in such a way that if the supply of the electric power is disconnected, the light may be turned off. A part of the multiple lamps may be designed to turn on in case where a switch is configured in multiple stages. A disposable type consumable battery may be used as a battery or a rechargeable type battery which can be recharged may be used.

In particular, the flashlight in general equips with a switch, thus controlling the turning on and off of the lamp with the switch. If the switch is turned on, the lamp is turned on, and if the switch is turned off, the lamp is turned off. If a multiple stage switch is attached, not to a simple turn on and off switch, the intensity, color, etc. of the lamp may be previously set for each stage, so the user can operate the switch as the user wants to when using the flashlight.

The switch is attached on an outer surface of the flashlight, so the user can operate in person the switch of the flashlight with a hand. However, it will be very desirable if the switch of the flashlight could be operated at a distant spot spaced away by a predetermined distance. In this case, the flashlight may be used for multiple purposes.

DISCLOSURE OF INVENTION

Technical Problem

Accordingly, it is an object of the present invention to provide a portable flashlight with a wireless switching function wherein it is connected wireless with the outside, thus obtaining various types of lamp flickering, for example, a lamp may be turned on or off or flickered in response to a radio signal.

The portable flashlight having a wireless switching function of the present invention may be used as an alarming means, a signal means, a warning means, etc. with the aid of lamp flickering in response to a radio signal in addition to a conventional switching function.

A flashlight in general is stored in a vehicle due to the natural features of such a flashlight. In case where a vehicle stops due to an accident or a breakdown and is not able to turn on an emergency lamp, an emergency flickering light can be turned on using the flashlight of the present invention.

Solution to Problem

To achieve the above objects, there is provided a portable flashlight with a wireless switching function which is able to receive an external radio signal.

The radio signal may use a conventional wireless network technology. Each radio switch may has an exclusive value, thus preventing any confusion between products.

In particular, considering that a vehicle in general equips with a portable flashlight, the present invention provides a portable flashlight wherein a portable flashlight stored in a vehicle can be used in emergency.

Advantageous Effects

The portable flashlight according to the present invention may turn on or off a light in response to an external signal using a radio switch, whereupon a user's hand may be free, and the portable flashlight of the present invention may be used for various purposes in addition to an alarming purpose using the same.

*** Brief legend of reference number ***

| | |
|---|---|
| 1: portable flashlight | 2: case housing |
| 3: handle unit | 4: lamp unit |
| 4': separable type lamp unit | 4": fixed type lamp unit |
| 5: winding unit | 6: hinge unit |
| 7: magnet | 10: power supply unit |
| 20: lamp | 30: switch |
| 40: radio switch | 41: radio receiver |
| 50: external transmitter unit | |

BEST MODES FOR CARRYING OUT THE INVENTION

The preferred exemplary embodiments of the portable flashlight with a wireless switching function which is able to flicker distantly the lamp of a flashlight in response to an electric radio signal will be described with reference to the accompanying drawing. It is obvious that the portable flashlight implemented in the exemplary embodiments of the present invention may be modified into various forms or may be substituted, and the technical concepts of the present invention are not limited to the descriptions below.

Figure 1:
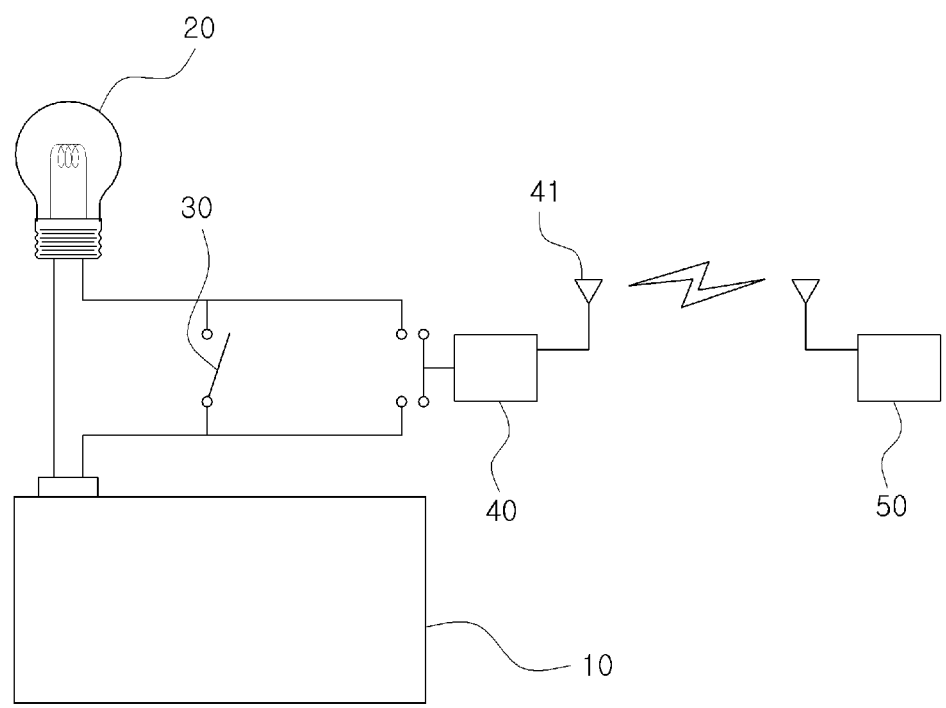
FIG. 1 is a view illustrating a schematic and conception configuration which shows a technical idea of the present invention.

FIG. 1 is a schematic and conception view for describing the technical concept of the present invention. In addition to a conventional configuration consisting of a power supply unit 10, a lamp 20, and a switch 30, the flashlight provided by the present invention further include a radio switch 40.

The power supply unit 10 may be a battery or a recharger. According to the situation, a separate electric power supply like a cigar jack of a vehicle may be available. The electric power of a flashlight in general is a direct current (DC) voltage. Two electric cables of a plus cable and a minus cable are connected to the lamp 20. A switch 30 is installed on one cable, thus controlling the supply of electric power.

The lamp 20 may consist of one or more electric bulbs. A reflection mirror may be provided at one side of the bulb so as to control the brightness of light and intensity. If the lamps are provided multiple in number, it may be possible to supply electric power to a part of the lamps in such a way to further connect electric cables.

The switch 30 basically has a common on/off switch so as to control the supply of electric power. If multiple switches are used, the lamps which are connected to the electric power may be configured different for each sage by providing a multiple stage switch.

The radio switch 40 further provided in the present invention may be configured in such a way that there is a radio receiver 41 for receiving an external signal. When an external transmitter unit 50 receives an external signal, electric power can be supplied to the lamp by connecting the switch. At this time, the external signal may be used by previously setting a specific signal at a specific frequency, thus preventing the radio switch from operating in response to other signals.

If the radio switch is used, it may not need to use the switch 30. For the sake of a user's convenience, it is preferred that both the switch 30 and the radio switch 40 are provided. As illustrated in FIG. 1, if the switch 30 is on, the lamp may be configured to always have light on. Only when the switch is off, the system may be configured in such a way that the lamp can be controlled through a radio switch. If the switch 30 is on, the lamp may be turned off by turning off it through the radio switch 40.

The external transmitter unit 50 may be provided in various types, for example, a cellular phone, a radio, an alarming device, etc. If a predetermined condition is satisfied through a users direct input or a sensor or a filter, a radio signal can be transmitted. When the radio switch 40 receives the transmitted radio signal, the switch can be operated, thus controlling the lamp of the flashlight.

A wireless connection between the radio receiver 41 of the radio switch and the external transmitter unit 50 may use a local area communication network, for example, a blue tooth, etc. Considering the features of the flashlight, it is preferred to use an external transmitter unit only within a predetermined distance.

In order for the radio switch 40 not to be interrupted with a radio signal of an external transmitter unit 50 of other products, it needs to store an exclusive value into a radio switch. With this, it is preferred that the system can operate only when an exclusive value is included in the received radio signal.

Figure 2A:
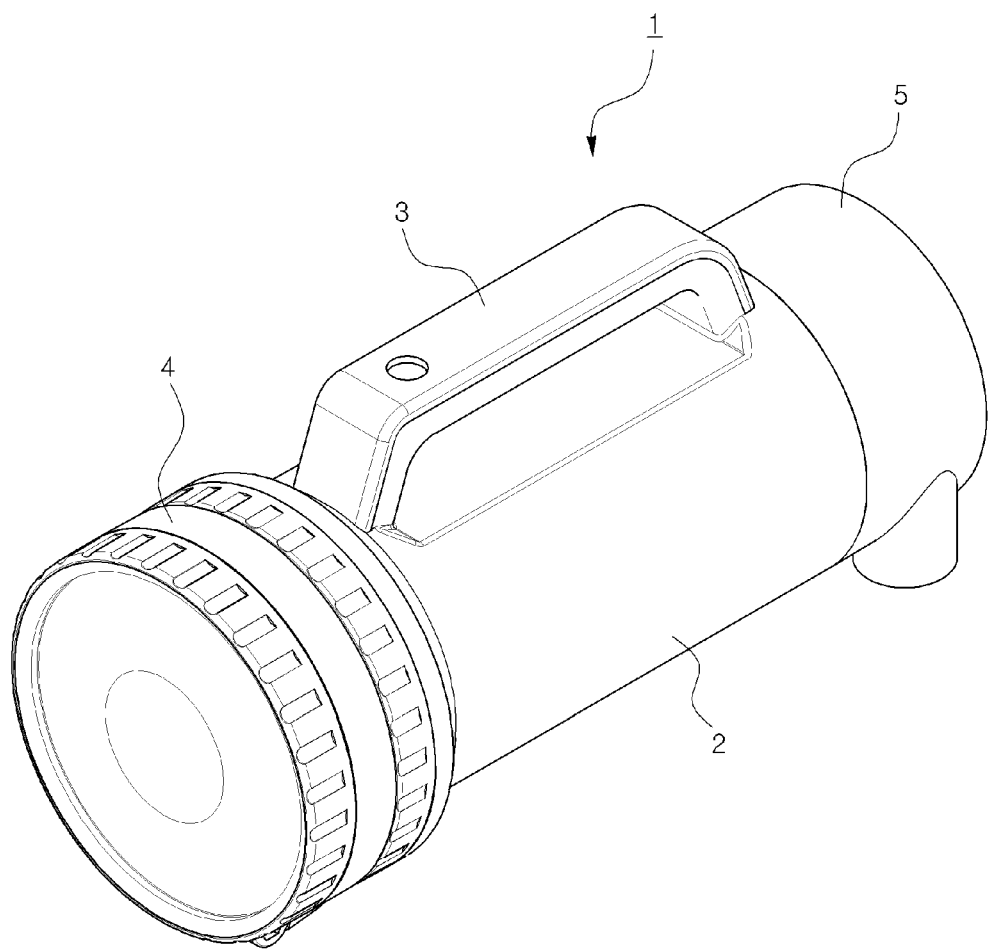
FIG. 2 is an exemplary view illustrating a finished product which uses a wireless switching function.
Figure 2B:
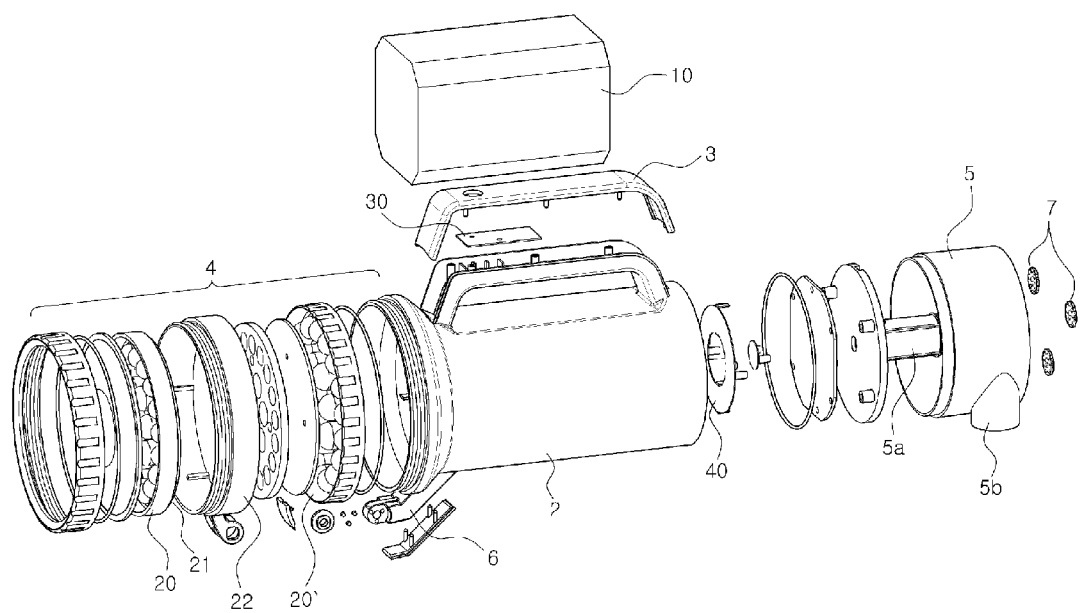

FIG. 2 is a perspective view for describing an exemplary embodiment of a product finished with a wireless switching function in FIG. 1, wherein FIG. 2A is a perspective view illustrating a portable flashlight, and FIG. 2B is a disassembled perspective view illustrating a flashlight in FIG. 2A.

When viewing the outer exterior of the portable flashlight of the present invention, it looks like a common flashlight, but on an outer surface of the flashlight, there is provided a radio receiver 41 so as to receive an external radio signal. Here, the portable flashlight 1 may include, but is not limited to, a case housing 2 which accommodates a battery and a radio switch in the inside thereof; a handle unit 3 formed at an end of one side of the case housing; and a lamp unit 4 installed on a front side of the case housing. There may be further provided a winding unit 5 in which an electric cable for charging electric power into the inside battery is wound.

The case housing 2 accommodates a battery, an electric cable and a radio switch in the inside thereof and forms an outer surface of the flashlight. On a front side of the case housing, the lamp unit 4 is installed, and the handle unit 3 is formed at an end of one side, and the winding unit 5 can be inserted into the backside.

The handle unit 3 may be formed at an end of one side of the case housing so that the user can easily use the flashlight. In particular, the switch 30 may be installed at one side of the top of the handle unit, thus controlling that the light of the lamp can be turned on with the aid of the switch.

The lamp unit 4 may include, but is not limited to, a lamp 20, a reflection mirror 21 installed at a backside of the lamp, and a lamp case 22. With this configuration, it is possible to effectively focus the light toward a front side of the flashlight when electric power is supplied to the lamp and the light is turned on. The above lamp 20 may be a conventional electric bulb, a LED, etc.

The winding unit 5 includes a winding drum 5a around which an electric cable (not shown) is wound in the inside thereof, wherein an electric cable is exposed from a discharge port 5b formed at an end of one side of the winding unit. The electric cable may be taken out to the outside for the sake of charging or the use of the flashlight. If the use is finished, the electric cable can be wound inside the winding unit by rotating the winding drum.

In addition, for the sake of the use as an emergency flickering lamp at a vehicle, a hinge unit 6 may be further installed between the case housing 2 and the lamp unit 4, and a magnet 7 may be attached on a backside of the wining unit.

The hinge unit 6 may be separated into two lamp units of which one lamp unit may be used as a separable type lamp unit and may be hinge-connected with the case housing, and the other lamp unit may be used as a fixed type lamp unit which is fixed at the case housing. At this time, a lamp can be installed at each of the separable type lamp unit and the fixed type lamp unit, whereupon light can be lighted toward another direction, not a forward direction of the portable flashlight with the aid of the hinge unit.

The magnet 7 is attached on a rear end of the winding unit 5, thus fixing the flashlight on a metallic plate, for example, a steel, etc. using a magnetic force thereof. More specifically, with the flashlight standing upright, the lamp unit can be rotated about the hinge unit when in use of the flashlight.

Figure 3:
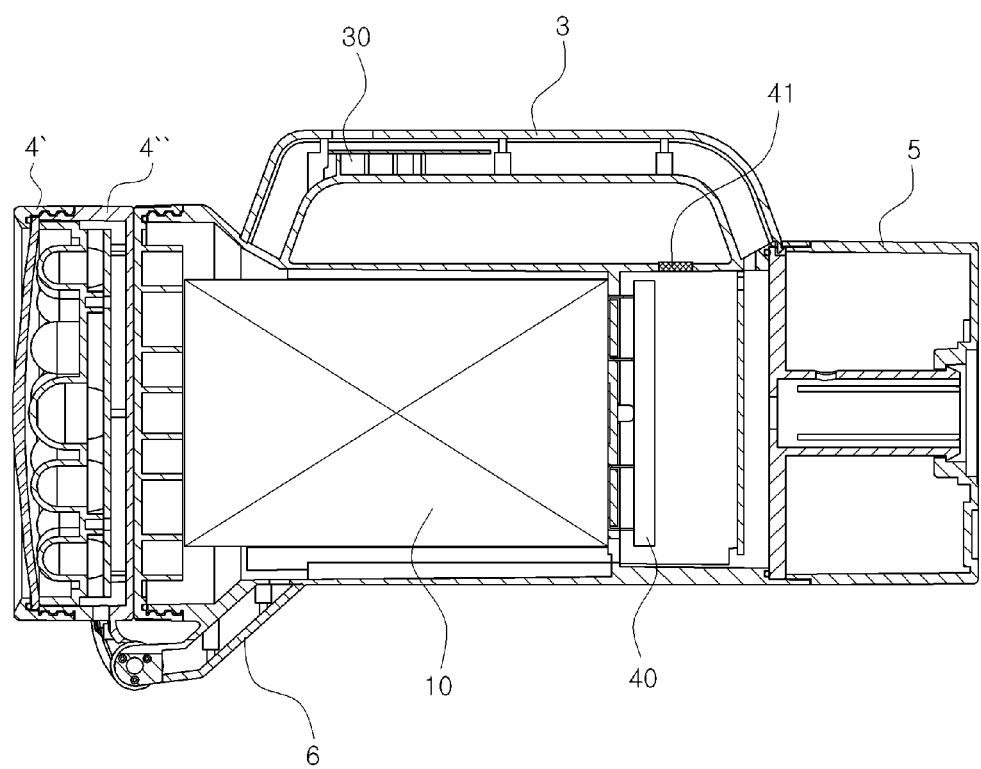
FIG. 3 is a side cross sectional view illustrating a flashlight in FIG. 2.

FIG. 3 is a cross sectional view illustrating the inside of a flashlight when viewing from a lateral side of the flashlight according to the present invention.

The power supply unit 10 and the radio switch 40 are accommodated in the inside of the case housing 2. The switch 30 is accommodated in the inside of the handle unit 3, thus controlling the supply of electric power to the lamp unit 4 of the front side. The lamp unit 4 is divided into the separable type lamp unit 4' connected to the hinge unit 6 and the fixed type lamp unit 4" fixed at the case housing as illustrated in the drawing.

In addition, the radio receiver 41 is exposed from one side of the top of the case housing to the outside, whereupon the radio switch 40 can receive an external signal.

The radio switch 40 may be provided in a form of a PCB substrate so as to receive and analyze the radio signal and to operate the switch.

Figure 4A:
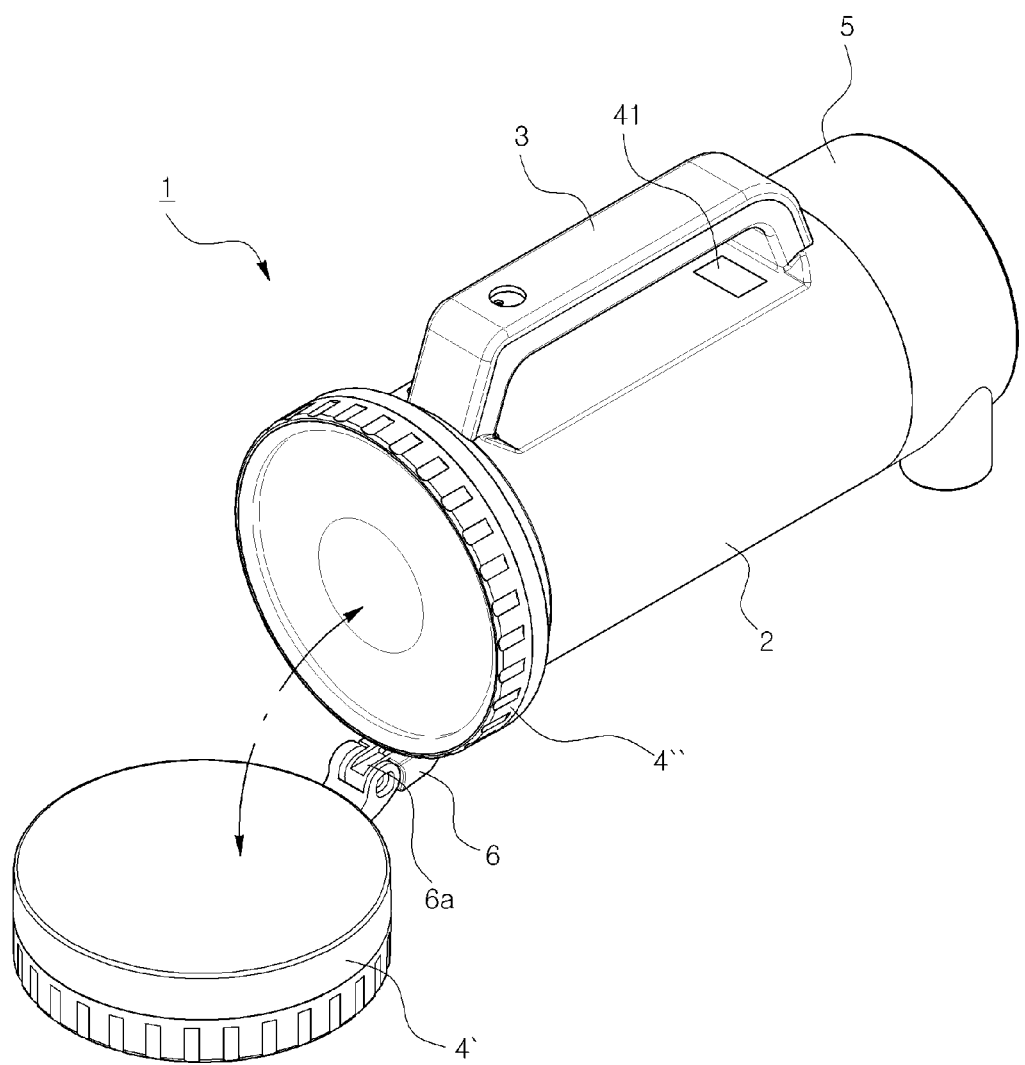
FIG. 4A is an exemplary view illustrating a separable lamp unit can rotate about a hinge unit.

FIG. 4A is a view illustrating an exemplary configuration wherein the separable type lamp unit 4' can rotate about the hinge unit 6. It shows an example wherein when in use, the lamp is installed at both the separable type lamp 4' and the fixed type lamp 4".

At this time, in the inside of the hinge unit 6, there may be a space 6a into which an electric cable is inserted so as to supply electric power to the lamp of the separable type lamp unit. In addition, it is preferred that there is provided an angle adjusting means at the hinge unit so as to adjust the rotation angle of the separable type lamp unit 4' and to continuously maintain the adjusted angle.

Figure 4B:
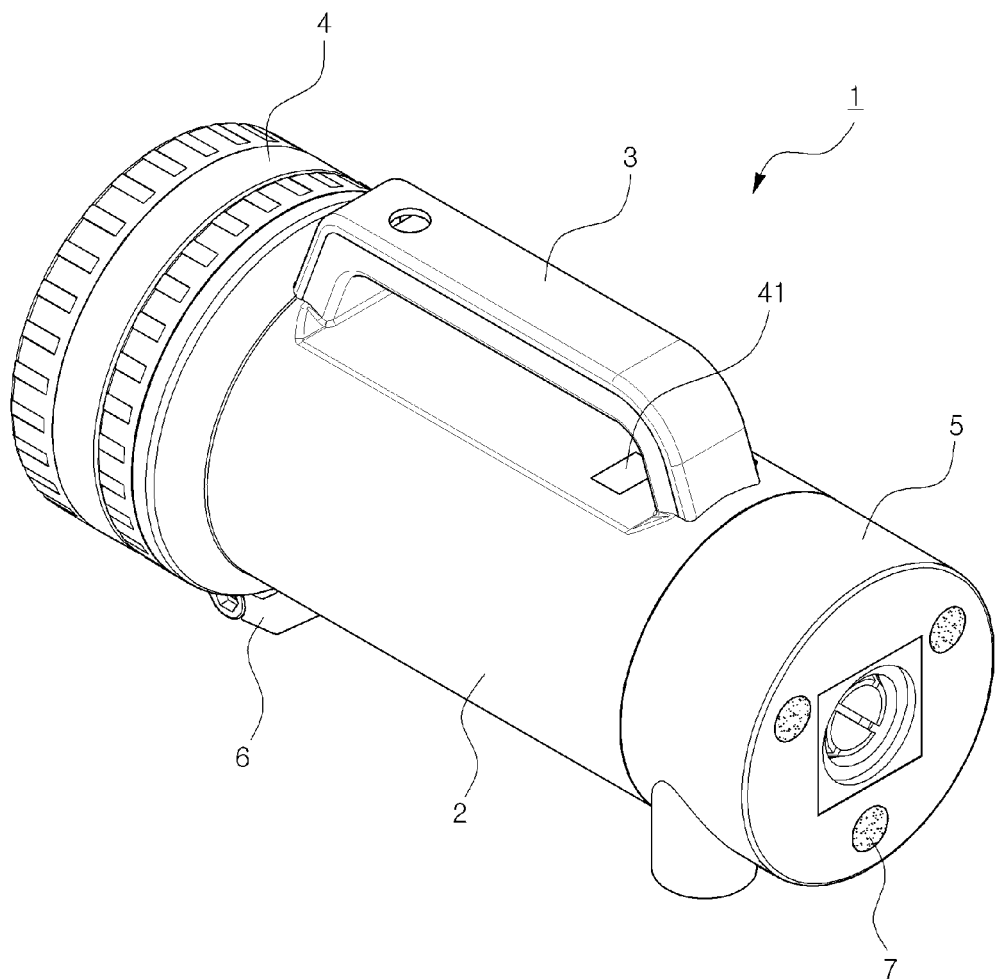
FIG. 4B is a perspective view illustrating a backside unit of a portable flashlight according to the present invention.

FIG. 4B is a perspective view illustrating a backside of the portable flashlight according to the present invention. More specifically, an arranging handle is connected to a winding drum 5a in the inside at a backside of the winding unit 5, thus winding an electric cable by rotating the arranging handle, and it is illustrated that the magnet 7 is attached on a back surface of the winding unit.

Figure 5A:
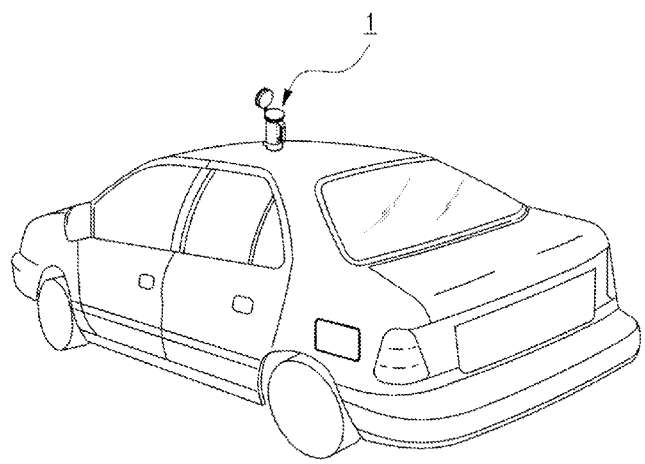
FIG. 5 is an exemplary view for describing an application method of a portable flashlight according to the present invention.
Figure 5B:
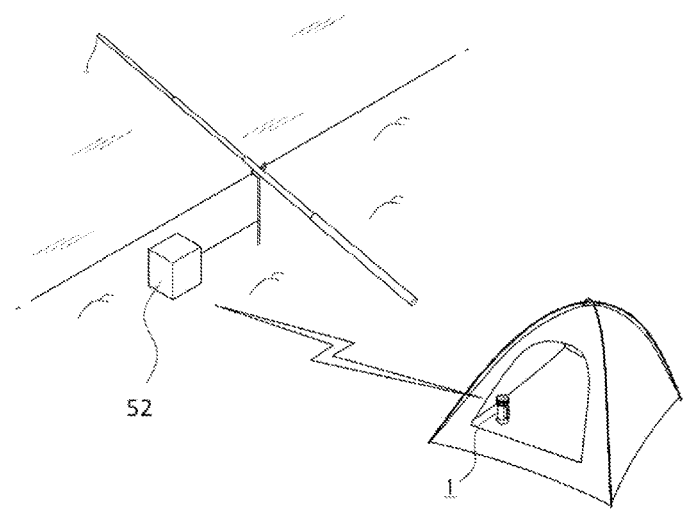

FIG. 5 is an exemplary view for describing an application method of the portable flashlight provided by the present invention, wherein FIG. 5A is a view illustrating a portable flashlight which can be used as an emergency flickering lamp for a vehicle, and FIG. 5B is a view illustrating a portable flashlight wherein even in a distant area without staying around the fishing spot, a user can know that a fish has been caught with the aid of a sensor when fishing because the flashlight is turned on when a fish is caught.

As illustrated in FIG. 5A, it needs to install an emergency flickering lamp so as to inform a following vehicle that a vehicle has stopped in the middle of the road because of an accident or a breakdown. At this time, the flashlight can be attached on a roof of a vehicle using a magnet, and the flashlight may light behind the vehicle by rotating the separable lamp unit with the aid of the hinge unit. Here, it shows that the separable type lamp unit can output an emergency flickering light by turning on the previously designated switch.

FIG. 5B is a view illustrating an example where a user can know even in a tent that a fish has been caught, in such a way that the sensor of a support member 52 detects when a fishing rod has a motion in a state where the user holds only the portable flashlight in the tent without looking beside the fishing rod, and the lamp of the flashlight is turned on through the external transmitter unit 50 as compared to the conventional way wherein the user should stay around the fishing rod because the user could not know when a fish is to be caught after casting a fishing bait at a fishing place.

The support unit designed to support a fishing rod is supported is installed on the support member 52. A circular hole is formed at a lower portion of the support member 52, and a ring larger than the circular hole is connected through a wire to an end of the fishing rod. If a fish bites a bait and pulls the fishing rod, the ring connected to the end of the fishing rod is hooked by the circular hole, thus preventing the fishing rod from fully going underwater, whereupon the sensor which detects the motion of the support unit operates, and the external transmitter unit 50 operates, thus informing that a fish has been caught.

In addition to the above two examples, the application method of a portable flashlight with a wireless switching function can be used wide and various fields.

The invention claimed is:
1. A portable flashlight with a wireless switching function, comprising:
   a power supply unit which supplies electric power;
   a lamp unit having an electric bulb attached; and
   a switch, wherein the portable flashlight further includes:
   a case housing which accommodates the power supply unit and the radio switch inside thereof;
   a handle unit which is disposed at an end of one side of the case housing and accommodates the switch; and
   a lamp unit which is installed on a front side of the case housing and includes a lamp, wherein a radio receiver is attached at an end of an outer surface of the case housing so as to receive an external radio signal,
   wherein the lamp unit of the portable flashlight is divided into a separable type lamp unit and a fixed type lamp unit, wherein the separable type lamp unit is hinge-connected to a hinge unit connected to the case housing, and the fixed type lamp unit is provided in a type fixed at the case housing, and on a backside of the portable flashlight, a winding unit for winding an electric cable is provided, and a magnet installed on a backside of the winding unit, whereupon during the running of the vehicle, the flashlight can be attached on a roof of the vehicle using a magnet, and the hinge-connected separable type lamp unit is arranged to face the backside of the vehicle, so the flashlight can be used as an emergency flickering lamp.

* * * * *